United States Patent [19]

Priola et al.

[11] 3,872,069

[45] Mar. 18, 1975

[54] PROCESS FOR THE POLYMERIZATION AND COPOLYMERIZATION OF ISOBUTYLENE

[75] Inventors: Aldo Priola; Sebastiano Cesca; Giuseppe Ferraris, all of San Donato Milanese, Italy

[73] Assignee: Snamprogetti, S.p.A., San Donato Milanese, Italy

[22] Filed: Mar. 9, 1973

[21] Appl. No.: 339,940

[30] Foreign Application Priority Data
Mar. 11, 1972 Italy................................ 21727/72

[52] U.S. Cl. ............................ 260/85.3 R, 260/94.8
[51] Int. Cl. ......................... C08d 1/26, C08d 3/10
[58] Field of Search ...................... 260/85.3 R, 94.8

[56] References Cited
UNITED STATES PATENTS

| | | | |
|---|---|---|---|
| 2,581,154 | 1/1952 | Walsh, Jr. et al. | 260/85.3 R |
| 2,697,694 | 12/1954 | Shalit et al. | 260/94.8 |
| 2,931,791 | 4/1960 | Ernst et al. | 260/85.3 R |
| 3,193,545 | 7/1965 | Argabright et al. | 260/85.3 R |
| 3,560,458 | 2/1971 | Kennedy et al. | 260/85.3 R |
| 3,694,377 | 9/1972 | Kennedy et al. | 260/85.3 R |

OTHER PUBLICATIONS

Briegleb, G., "Electron Affinity of Organic Molecules," Angewandte Chemie (Int. Ed.), 3, pp. 617–632 (1964).

Foster, R., "Organic Charge-Transfer Complexes," Academic Press, London (1967), pp. 386–388.

*Primary Examiner*—Joseph L. Schofer
*Assistant Examiner*—A. Holler
*Attorney, Agent, or Firm*—Ralph M. Watson, Esq.

[57] ABSTRACT

A process is disclosed whereby butyl rubber of high molecular weight and excellent physical characteristics is readily prepared by copolymerizing isobutylene and isoprene in the presence of a catalyst system consisting of:

a. a metalorganic compound (e.g., Al $Et_2$ Cl); and b. an organic compound having from 1 to 24 carbon atoms and an electron affinity value in the range from 0.3 to 2 electron volts (e.g., 1.3.5.-trinitrobenzene).

6 Claims, No Drawings

PROCESS FOR THE POLYMERIZATION AND COPOLYMERIZATION OF ISOBUTYLENE

This invention relates to a process for the polymerization and copolymerization of isobutylene using a particular catalyst system which permits higher reaction temperatures than those previously used industrially; it also makes it possible to obtain higher yields in polymers having a higher molecular weight and generally better properties, logically dependent upon the operating conditions selected and other factors known to those skilled in the art.

More particularly, this invention relates to the production of butyl rubber.

It is well known that butyl rubber is industrially produced by means of a process of copolymerization achieved by utilizing cationic type initiators. In particular, the copolymerization is achieved by utilizing $AlCl_3$ in ethyl chloride or methyl chloride solution at $-100°C$.

The use of solid catalyst insoluble in common hydrocarbon solvents and only slightly soluble in chloride solvents, has created many difficulties in the realization of an efficacious control of this reaction. The preparation of the catalyst solution itself is somewhat complex, and in general, it is achieved by passage of a current of ethyl chloride or methyl chloride on a bed of solid trichloride aluminium.

Also the subsequent determination of the concentration of the catalyst through titration of the $AlCl_3$ gives results which are very complex and it often gives very unexpected results. It is evident from the above that recently there has been much effort on the part of various researchers and industries interested in the production of this type of rubber, towards the discovery of a new catalyst system that would simultaneously solve the problems of the dosage for the catalyst and the raising of the temperature of polymerization without of course, compromising the properties of the rubber and, in particular, without lowering the value of the molecular weight. Recently, some researchers perfected a new soluble catalyst system that enables us to obtain butyl rubber with a high molecular weight at considerably higher temperatures than those normally used in industrial processes.

The system in question derives from a combination of an haloid of Friedel-Crafts modified, for example Al $Et_2$ Cl, with an appropriate co-catalyst. These halides are not usually capable of initiating the polymerization of isobutylene by themselves, or of mixtures of isobutylenediene monomers or other monomers, that normally polymerize with a cationic type mechanism.

The polymerization or copolymerization begins only when the co-catalyst is introduced. This co-catalyst may be composed of a substance able to produce protons such as, for example H Cl and other Bronsted acids, or by a substance capable of supplying carbon ions, such as, for example, chloride of t-butyl. The assignee of this application also owns patent applications pertaining to a procedure for the production of butyl rubber by means of the use of a catalyst system constituted by a reducing aluminium compound and by some co-catalysts.

Particularly in a patent application the co-catalyst may be a halogen introduced as such, or other interhalogenic compounds.

The process which has now been perfected by us, and which constitutes the subject of this application, presents all the advantages of the catalyst systems mentioned previously and which are essentially connected with considerable ease in the control of the polymerization reaction owing to the solubility of these catalyst in common organic solvents, so that whenever necessary, it is possible to operate with minimum quantities of solvent or even in its total absence, in which case, the same non-reacted monomer functions as a diluent.

In respect to the processes using halides of dialkylaluminium and strong acids, it also presents the advantages of obtaining products of higher molecular weight and even higher reaction temperatures. It also presents major regularity in the polymerization process, permitting in fact, a major control of the temperatures and therefore a higher regularity in the polymers produced.

Then, in respect to the systems using halogen solutions and interhalogenic compounds, it has the great advantages of being easier to handle with regard to the compounds used as catalyst. Besides, it has the still greater advantage of greater ease in dosing the co-catalyst, eventually also during polymerization, as compared to the Bronsted acids, and it is more economical with regard to the co-catalysts composed of alkylic halides, especially taking into account the high quality of purity that they must have.

While this application is primarily concerned with the production of butyl rubber, in view of the industrial interest in this substance, it will be easy for the expert on the subject using the catalyst system described herein, to find the ideal conditions for the copolymerization of different monomers.

In particular, the usable mono-olefine may include from 4 to 9 carbon atoms ($C_4 - C_9$), while the multiolefine is generally constituted by conjugated diolefines with from 4 to 14 carbon atoms ($C_4 - C_{14}$), such as isoprene, butadiene, 2.3 dimethyl 1.3 butadiene, while examples of the first may be isobutene; 2-methyl butene-1, 3-methyl-butene-1, 2-methyl-butene 2, 4-methyl-penthene-1. As noted above, only great industrial interest has prompted us to limit our examples to the case of butyl rubber that is, to the copolymerization of isobutylene and isoprene in quantities ranging from 80 to 99.5 % in isobutylene weight and from 20 to 0.5 % in isoprene weight.

The reaction media used are those which are normally used in the art, and that is, ethyl chloride, methyl chloride, or methylene chloride. Hydrocarbon compositions may also be used as long as they are liquid at the temperature of reaction, such as for example, pentane, isopentane, n-heptane, cyclohexane, or even solvents maintained in a liquid phase at the temperature of reaction, such as the monomer or the monomers used.

The molecular weights of the product obtained vary over a wide range according to the conditions adopted.

The catalyst system of the invention includes:

a. a metalorganic compound having the following general formula $$R_m Me X_n$$

wherein

R is a monovalent, alkyl, aryl, cycloalkyl, aralkyl or alkylaryl radical having from 1 to 12 carbon atoms;
X is halogen, hydrogen, alkoxy or an ester group;
Me is a metal selected from Al, Ti, Sn, V, Zn, B, Pb, W, Zr, As, Bi and Mo;
m may be 0 or an integer ranging from 1 to 4;

$n$ is a number ranging from 1 to 5;
$m + n$ being the valence of the metal Me.

b. an organic compound having from 1 to 24 carbon atoms containing one or more functional groups selected from the following:

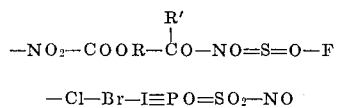

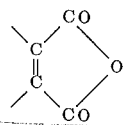

and having an electron affinity value ranging from 0.3 to 2 electron volt, R' being equal to R or hydrogen.

As to the value of electron affinity we mean the ones obtained from UV and visible spectroscopy data by using the relation being between electron affinity and frequency ($\nu_{CT}$) of the electron transition bound to the charge transfer with a common compound able to give electrons:

$$E^A (1) = E^A (2) - h \nu (1) - h \nu (2)$$

($h$ = Plank constant). The operative details useful for obtaining the aforesaid measurements are reparted in the articles of Briegleb: "Angewandte Chemie" (Int. Ed.) 3, 617, (1964), or in the book of R. Foster: "Organic Charge. Transfer complexes," London, Academic Press, pag. 387. As reference compound (2) we selected chloroanile whose $E^A$ value is 1.37 electron volts.

Illustrative examples of compounds of (a) type are: Al Et$_2$ I, Al Et$_2$ Cl, Al Et$_2$ Br, Al Et I$_2$, Ti Cl$_4$, Al Cl$_3$, Al Br$_3$, Sn Cl$_4$, V Cl$_4$, Al Et O Et Cl, BF$_3$, Al Et Cl$_2$, Al$_2$ Et$_3$ Cl$_3$, B Cl$_3$, Fe Cl$_3$, Al (i-butyl)$_2$Cl, Al (i-butyl) Cl$_2$ and the like.

Examples of (b) are: 2.4.6-trinitrotoluene, 1.3.5-trinitrobenzene, 2.4.7-trinitro-9-fluorenone, 1.4-dinitrobenzene, 1.3-dinitro-benzene, 1.2-dinitrobenzene, 2.4.5.7-tetranitro-9-fluorenone, pyromellitic anhydride, dichloro-pyromellitic anhydride, tetrachloro-phthalic anhydride, tetranitro-methane, 2.6-dinitro-benzoquinone, 2.3-dichloro-5.6-dicyano-p.benzoquinone, o-chloranile, o-bromanile, p-chloranile, p-bromanile, p-iodanile, 2.3.5 trichloro-p.benzoquinone, 2.6-dichloro-p-benzoquinone, 2.5-dichloro-p-benzoquinone, 2.3-dichloro-p-benzoquinone, 1.2 naphtho-quinone, 2.2'. 6.6'-tetranitro-diphenyl.

The catalyst may be preformed under suitable conditions by reacting the reagents in various experimental conditions easily achievable to the man skilled in the art, or may be prepared in situ by slowly adding the co-catalyst to the reaction vessel itself: in either event the molar ratio between the total amount of compound (b) and compound (a) ranges from 10 to $10^{-4}$ and preferably from 5 to 0.005.

The polymerization reaction may be carried out at temperatures ranging from $-100°$ to $+30°C$ and preferably from $-70°$ to $+15°C$.

The pressure may be in the range between atmospheric pressure and 40 atmospheres.

The molecular weights of the polymers prepared in the following examples were obtained through viscosimetric measures of polymer solutions in cyclohexane at 30°C. After having determined the intrinsic viscosity by extrapolation at $C = 0$ of the curves $\ln\eta_{sp}/C$ and $\eta_{sp}/C$, the average molecular weight of the single polymers was calculated according to the following equation:

$$\ln M_v = 11.98 + 1.452 \ln [\eta]$$

The invention will be more easily understood from consideration of the following illustrative examples.

EXAMPLE 1

We used a completely glass tubular reactor having capacity of 300 cm$^3$, equipped with a mechanical agitator and a thermometric sheath, previously dessicated by heating under a dry Argon flow, and kept during the performance of the experiment, under a slight positive pressure of Argon (20–30 torr in respect to the atmospheric pressure).

In this apparatus, we condensed 80 cm$^3$ of CH$_3$ Cl then we introduced 28.4 grams of isobutene, 0.84 grams of isoprene 2 mmoles (cc 0.254) of Al Et$_2$ Cl maintaining the temperature at $-40°C$ by means of a thermostatically controlled bath. To the reaction mixture we subsequently added while vigorously shaking heavily 0.21 m.mole of 1.3.5-trinitrobenzene (previously twice crystallized from toluene) dissolved in CH$_3$ Cl graduating the addition over a period of 5 minutes during which we observed a 5°C increase in temperature. We continued the shaking for 10 minutes after the addition was finished, then we stopped the reaction by adding methyl alcohol to the suspension of the polymers produced. We obtained 11.4 grams of dry polymer (Yield = 40 %) which presented a $[\eta]$ equal to 2.31 dl/g, determined in cyclohexane at 30°C which corresponded to an average viscosimetric molecular weight equal to 510,000 and a content of unsaturation, determined iodometrically, corresponding to 2.32 % in isoprene weight.

The polymer obtained was made to undergo vulcanization in slit plates using a mixture of the following composition prepared on an open roll mixer:

| | |
|---|---|
| Polymers | 100 parts |
| EPC black | 50 parts |
| Antioxidant 2246 | 1 part |
| Z$_n$O | 5 parts |
| Stearic Acid | 3 parts |
| Sulphur | 2 parts |
| MBTDS (mercapto-benzothiazoledisulphide) | 0.5 parts |
| TMDT (tetramethyl-thyuramedisulphide) | 1 part |

The mixture was vulcanized at 153°C for 40 and 60 minutes. The properties of the vulcanized products obtained are set forth in Table 1; Table 2 shows as a means of comparison, the properties of a typical sample of commercial butyl rubber determined under the same conditions.

TABLE 1

| | | |
|---|---|---|
| Vulcanization time (minutes) | 40 | 60 |
| Modulus at 100 % (kg/cm$^2$) | 15 | 17 |
| Modulus at 200 % (kg/cm$^2$) | 28 | 34 |
| Modulus at 300 % (kg/cm$^2$) | 48 | 56 |
| Ultimate tensile strength (kg/cm$^2$) | 218 | 205 |
| Elongation at break (%) | 735 | 640 |
| Permanent set (%) | 34 | 31 |

TABLE 2

| Vulcanization time (°) (minutes) | 40 | 60 |
|---|---|---|
| Modulus at 100 % (kg/cm$^2$) | 15 | 16 |
| Modulus at 200 % (kg/cm$^2$) | 27 | 33 |
| MOdulus at 300 % (kg/cm$^2$) | 47 | 58 |
| Ultimate tensile strength (kg/cm$^2$) | 219 | 210 |
| Elongation at break (%) | 715 | 650 |
| Permanet set (%) | 29 | 29 |

(°) Butyl rubber Enyay B218 with viscosimetric molecular weight equal to about 450,000 and unsaturation contents corresponding to 2.15 % in isoprene weight.

The results obtained showed that the polymer obtained in this experiment, conducted at a temperature in the range between − 38° and − 40°C presented, after vulcanization, properties very similar to those of commercial butyl rubber, which, as is well known, was produced at a temperature of about − 100°C.

By carrying out the experiment again without adding any 1.3.5-trinitrobenzene no polymer formation was observed in our experimental conditions.

EXAMPLE 2

The experiment described in example 1 was repeated but we used as a co-catalyst a solution containing 0.39 m.mole of 1.3.5-trinitrobenzene dissolved in CH$_3$Cl and as catalyst 1 m.mole (cc 0.127) of Al Et$_2$ Cl. The experiment was conducted at a temperature of − 35°C and the addition of the co-catalyst was carried out over a period of 4 minutes during which we had an increase in temperature of 2°C. We obtained 10.1 g of dry polymer (yield = 35.6 %) which presented a [η] equal to 2.13 dl/g (PMv = 460,000), and an unsaturation content corresponding to 2.62 % of isoprene weight.

The polymer was vulcanized according to the methods described in example 1 and the properties of the vulcanized products obtained were similar to the ones reported in Table 1.

EXAMPLE 3

With the same methods reported in example 1, we introduced into the reactor the same quantities of solvent, monomers and Al Et$_2$ Cl (0.254 cc). The reaction was set off at the T of − 40°C through gradual introduction of a solution of 0.44 m.mole of 2.4.6-trinitrotoluene (previously twice crystallized from toluene) in CH$_3$ Cl over a period of 3 minutes, during which we obtained a temperature increase of 1°C. We obtained 6.95 of dry polymer (yield = 24.5 %) having [η] = 1.87 dl/g (PMv = 380,000) and an isoprene content equal to 2.5 % by weight. The properties of the polymer were similar to those reported for the sample in example 1.

EXAMPLE 4

We repeated the experiment as per the one described in the preceding example but we employed as co-catalyst 0.8 m.mole of pyromellitic anhydride (previously sublimed under vacuum) added directly to the reaction mixture.

We observed a temperature increase of 1°C. After stirring for 10 minutes the reaction was stopped and 10.5 g of dry polymer were obtained (yield = 37.0 %).

The polymer showed a [η] equal to 1.95 dl/g ($\overline{M_rW}$ = 400,000) and an unsaturation content equal to 2.22 % in isoprene weight.

In table 3 are reported the properties of the cured products obtained by employing the same experimental procedure described for the sample of example 1.

TABLE 3

| Vulcanization time (minutes) | 40 | 60 |
|---|---|---|
| Modulus at 100 % (kg/cm$^2$) | 15 | 16 |
| Modulus at 200 % (kg/cm$^2$) | 27 | 32 |
| Modulus at 300 % (kg/cm$^2$) | 45 | 54 |
| Ultimate tensile strength (kg/cm$^2$) | 205 | 206 |
| Elongation at break (%) | 730 | 690 |
| Permanent set (%) | 35 | 33 |

By comparing the data of the preceding table it is possible to conclude the properties of these copolymers are very similalr to the ones of the samples previously reported and corresponding to the characteristics of the best commercial butyl rubber samples.

EXAMPLE 5

Use is made of the same solvent and monomer amounts and the same procedure as in example 1 but the catalyst was preformed by reacting, aside, at room temperature, 2 m.moles of Al Et$_2$ Cl with 0.24 m.moles of pyromellitic anhydride in 5 cm$^3$ of CH$_2$ Cl$_2$ for 5 minutes.

The addition of the catalyst was performed over a period of 12 minutes during which we obtained a temperature increase of 3°C. The reaction was continued for another 10 minutes and, after the reaction was stopped, 10.85 g of dry polymer were obtained (yield = 38.2 %) which shows a [η] equal to 1.84 dl/g ($\overline{M_rW}$ = 370,000) and an unsaturation content equal to 2.35 % in isoprene weight. The physical and technological characteristics were similar to the one of the preceding sample.

EXAMPLE 6

According to the experimental procedure described in example 1 and by employing the same amounts of reactants, the reaction was started by 0.25 m.mole of 2.4.7-trinitro-9-fluorenone.

The addition was carried out over a period of 3 minutes during which we noted a temperature increase of 3°C. After 10 minutes additional stirring, the reaction was stopped with methyl alcohol and 5.5 g of dry polymer were obtained (yield = 19 %) which showed a [η] equal to 1.88 dl/g ($\overline{M_rW}$ = 380,000), an unsaturation content equal to 2.20 % in isoprene weight, and characteristics similar to the ones reported for the preceding samples.

EXAMPLE 7

Use was made of the same solvent and monomer amounts as described in example 1: then to the mixture was added with 0.4 m.mole of pyromellitic anhydride and the temperature was brought to − 40°C.

The reaction mixture was kept under strong stirring, and there was slowly added 0.2 m.mole of Ti Cl$_4$ dissolved in 5 cc of CH$_3$ Cl over a period of 7 minutes during which a temperature increase of 4°C was obtained. After 10 minutes additional stirring, the reaction was stopped with methyl alcohol and 16.10 g of dry polymer were obtained (yield = 56.5 %) having [η] = 1.80 dl/g ($\overline{M_rW}$ = 360,000) and unsaturation content equal to 3.7 % in isoprene weight.

It is to be noted that the same experiment, carried out in the absence of pyromellitic anhydride, gave rise to a polymer having [η] = 1.21 dl/g ($\overline{M_rW}$ = 200,000), isoprene content equal to 28 % by weight and physical characteristics unsatisfactory for use as an elastomer.

EXAMPLE 8

The preceding experiment was repeated but to the reaction mixture was added, before the addition of Ti Cl$_4$, 0.06 m.mole of chloroanile (tetrachloro-p-benzoquinone).

The addition of Ti Cl$_4$ (0.2 m.mole dissolved in 5 cc of CH$_3$ Cl) was carried out over a period of 4 minutes during which we observed a temperature increase of 4°C. 13.05 g of dry polymer were obtained (yield = 46.0 %) having [$\eta$] = 1.62 dl/g ($\overline{M_rW}$ = 310,000) and isoprene content equal to 3.2 % by weight.

EXAMPLE 9

By using the same procedure as in example 1, the same solvent and monomer amounts and 2 m.moles of Al Et O Et Cl were reacted. The temperature was brought to − 40°C, then 0.09 m.mole of chloroanile was slowly added over a period of 3 minutes, during which we noted a temperature increase of 1°C. 3.55 g of dry polymer were obtained (yield = 12.5 %) having [$\eta$] = 1.52 dl/g ($\overline{M_rW}$ = 285,000) and unsaturation content equal to 3.05% in isoprene weight.

By performing again the same experiment without any addition of chloroanile, no polymer was formed.

EXAMPLE 10

The experiment of example 1 was repeated but, as catalyst, use was made of 2 m.moles of Al Et$_2$ Br and, as co-catalyst, of 0.1 m.mole of tetrabromo-p-benzoquinone (bromanile) dissolved in CH$_3$ Cl. The addition of the co-catalyst was carried out over a period of 5 minutes during which a temperature increase of 2°C occurred.

The reaction was stopped after 10 minutes during which stirring was performed again and 13.5 g of dry polymer were obtained (yield = 47.5 %) which had a [$\eta$] equal to 2.05 dl/g ($\overline{M_rW}$ = 430,000), an unsaturation content equal to 2.9 % in isoprene weight and properties after vulcanization similar to the ones reported for the sample of example 1.

EXAMPLE 11

Use was made of the same solvent and monomer amounts as in example 1, then to the reaction mixture was added with 0.1 m.mole of pyromellitic anhydride and the temperature was brought to −40°C.

Then 0.1 m.mole of Al Et Cl$_2$ was showly added to the reaction mixture, dissolved in 5 cc of CH$_3$ Cl, over a period of 4 minutes, during which a temperature increase of 2°C occurred.

9.4 g of dry polymer were obtained (yield = 33 %) having [$\eta$] = 1.70 dl/g ($\overline{M_vW}$ = 330,000) and an unsaturation content equal to 2.95 % in isoprene weight.

By repeating the experiment without adding any pyromellitic anhydride, a polymer was obtained having [$\eta$] = 1.10 dl/g ($\overline{M_rW}$ = 175,000), an isoprene content equal to 2.7 % by weight and properties quite unsatisfactory for use as an elastomer.

What we claim is:

1. Process for the production of butyl rubber through the copolymerization of isobutylene and isoprene wherein the improvement comprises conducting the copolymerization reaction in the presence of a catalyst system consisting essentially of:
   a. a metalorganic compound having the following general formula $$R_m \text{ Me } X_n$$

wherein
   R is a monovalent alkyl, aryl, cycloalkyl, aralkyl or alkylaryl radical having from 1 to 12 carbon atoms;
   Me is a metal selected from Al, Ti, Sn, V, Zn, B, Pb, W, Zr, As, Bi and Mo;
   X is halogen, hydrogen, alkoxy or an ester group;
   $m$ may be 0 or an integer ranging from 1 to 4;
   $n$ is a number ranging from 1 to 5;
   $m + n$ being the valence of the metal Me; and
   b. an organic compound having an electron affinity value ranging from 0.3 to 2 electron volts, selected from the group consisting of: 1,3,5-trinitrobenzene; 2,4,6-trinitrotoluene; pyromellitic anhydride; 2,4,7-trinitro-9-fluorenone; tetrachloro-p-benzoquinone and tetrabromo-p-benzoquinone.

2. Process according to claim 1 wherein the molar ratio between the total quantities of composition b) and composition a) is in the range between 10 and $10^{-4}$.

3. Process according to claim 1 wherein the polymerization reaction is effected in a reaction medium selected from the aliphatic, aromatic, cycloaliphatic and mono- or poly- halogenated hydrocarbons.

4. Process as per claim 3, wherein the reaction medium is methyl chloride.

5. Process according to claim 1, wherein the copolymerization reaction is conducted at a temperature in the range between − 100° and + 30°C inclusive.

6. Process according to claim 1 wherein the isobutylene and the isoprene are fed in variable quantities ranging from 80 to 99.5% of isobutylene by weight, and from 20 to 0.5% of isoprene by weight.

* * * * *